(12) United States Patent
Kirshman et al.

(10) Patent No.: US 8,596,572 B1
(45) Date of Patent: Dec. 3, 2013

(54) SOLAR POWERED RADIOMETRIC LIFT DEVICE

(75) Inventors: David Kirshman, Huntington Beach, CA (US); David A. Deamer, Seal Beach, CA (US); Maurice P. Bianchi, Palos Verdes Estates, CA (US)

(73) Assignee: The Boeing Company, Chicago, IL (US)

(*) Notice: Subject to any disclaimer, the term of this patent is extended or adjusted under 35 U.S.C. 154(b) by 1153 days.

(21) Appl. No.: 12/537,573

(22) Filed: Aug. 7, 2009

(51) Int. Cl.
*B64C 39/00* (2006.01)

(52) U.S. Cl.
USPC .......................... 244/34 R; 244/126; 244/1 R

(58) Field of Classification Search
USPC .......... 244/30, 25, 26, 27, 28, 29, 31, 24, 59, 244/1 R, 96, 125, 126, 128, 34 R
See application file for complete search history.

(56) References Cited

U.S. PATENT DOCUMENTS

| | | | | |
|---|---|---|---|---|
| 1,000,831 A * | 8/1911 | Martin | .......................... | 356/216 |
| 4,410,805 A * | 10/1983 | Berley | .......................... | 290/1 R |
| 4,801,113 A * | 1/1989 | Engelhardt | .................. | 244/121 |
| 4,926,037 A * | 5/1990 | Martin-Lopez | ............... | 250/205 |
| 2006/0000215 A1* | 1/2006 | Kremen et al. | .................. | 60/721 |
| 2006/0001569 A1* | 1/2006 | Scandurra | ..................... | 342/351 |

FOREIGN PATENT DOCUMENTS

WO    WO 2007002600 A2 *  1/2007

\* cited by examiner

*Primary Examiner* — Benjamin P Lee
(74) *Attorney, Agent, or Firm* — Ameh IP; Lowell Campbell; Elahe Toosi

(57) ABSTRACT

A solar powered radiometric lift device operable to generate sustained lift is disclosed. A hot surface powered by solar energy and a colder surface are utilized to generate a pressure differential via free molecular momentum exchange. An insulating space may be situated between the hot surface and the colder surface, and formed into channels allowing thermal transpiration. The solar powered radiometric lift device is operable to provide sufficient lift for a geostationary stratospheric platform. Embodiments of the solar powered radiometric lift device are further operable to provide station keeping thrust and controllability.

20 Claims, 5 Drawing Sheets

SOLAR POWERED RADIOMETRIC LIFT DEVICE

FIELD

Embodiments of the present disclosure relate generally to radiometric devices. More particularly, embodiments of the present disclosure relate to solar powered radiometric devices.

BACKGROUND

It is desirable to have platforms at high altitude to provide communication relay and broadcasting, imaging of the earth's surface, atmosphere and weather monitoring, and numerous other applications. At present, there are few methods available for providing a persistent presence at high altitude. For operation between 55 km and 200 km, there are essentially a limited number of approaches. Aircraft, balloons, airships, and satellites have been tried; however, many existing approaches are considered to be inefficient.

Aircraft such as the U-2, the SR-71, and some unmanned aerial vehicles (UAV) are able to operate up to 40 km in altitude and persist for up to 24 hours. Refueling and alternate power sources may allow persistence indefinitely; however, aircraft must remain in continuous motion, and wing lift is limited to about 40 km in altitude unless operating at extremely high speeds. Rockets may travel higher, but only for a few minutes.

Balloons can operate for long periods of time, but only up to 55 km. Balloons are also subject to wind and have difficulty maintaining position. Prior to 2002, the altitude record for unmanned balloons was 51.8 km (170,000 ft) set by a balloon with a volume of 1.35 million cubic meters launched in October 1972. On May 23, 2002, a Japanese attempt (BU60-1) reached a new record with a 60,000 m$^3$ ultra-thin-film balloon made of a 3.4 µm thick polyethylene film. The balloon reached an altitude of 53.0 km (174,000 ft) to establish the first new world record in 30 years.

Airships can operate and persist, but only up to about 25 km. Generally, these airships are unmanned aerial vehicles (UAV) designed to operate as remotely operated aircraft (ROA). A team sponsored by the Army Space and Missile Defense Command and led by the Southwest Research Institute demonstrated a stratospheric airship (HiSentinel) in powered flight at an altitude of 74,000 feet (22.6 km) on Dec. 4, 2005. The United States Department of Defense Missile Defense Agency currently has plans to build a high-altitude airship as a platform for radar to enhance ballistic missile defense. The high-altitude airship is a lighter-than-air UAV designed to operate as a surveillance platform, telecommunications relay, or a weather observer. The airship would remain in the air for up to one month at a time in a quasi-geostationary position at a height of above 18 km (60,000 feet) using solar cells to provide electrical power. It will be about 150 m (500 feet) long and about 46 m (150 feet) in diameter, and operable to survey land in a 600-mile (970 km) diameter.

Satellites generally operate above 200 km. Several orbits are used for earth communication and observation. Some of the more commonly used orbits are low earth orbits, semi-synchronous (e.g., Molniya) orbits, and geosynchronous orbits. Given the rapid orbital decay of orbits below approximately 200 km, a low Earth orbit (LEO) is generally defined as an orbit between 200 km-2,000 km above the Earth's surface. LEO satellites generally move at about 11 km/s. A semi-synchronous orbit has an orbital period of about 12 hours. Relative to the Earth's surface, it has twice this period, and hence appears to go around the Earth once every day. Examples include the Molniya orbit and the orbits of Global Positioning System satellites. A satellite in Molniya orbit varies in altitude from about 1,500 km to about 40,000 km. A geosynchronous orbit is an orbit around the Earth matching the Earth's sidereal rotation. For an observer at a fixed location on Earth, a satellite in a geosynchronous orbit remains at approximately the same place in the sky during each day. A satellite in geostationary orbit is at an altitude of about 36,000 km. The very high cost and very high altitude limit the useful applications at geostationary orbit.

Most of the above approaches do not provide sufficient time and persistence over a location, or operate effectively at high non-orbital altitudes. Therefore, there is a need for a relatively stationary platform capable of operating effectively at high altitudes.

SUMMARY

A solar powered radiometric lift device operable to generate sustained lift is disclosed. A hot surface powered by solar energy and a colder surface are utilized to generate a pressure differential via free molecular momentum exchange. An insulating space may be situated between the hot surface and the colder surface, and formed into channels allowing thermal transpiration. The solar powered radiometric lift device is operable to provide sufficient lift for a geostationary stratospheric platform. Embodiments of the solar powered radiometric lift device are further operable to provide station keeping thrust and controllability.

A first embodiment comprises a solar powered radiometric lift device. The solar powered radiometric lift device utilizes a unique material construction that absorbs solar energy creating a thermal gradient. The solar powered radiometric lift device utilizes thermal transpiration and/or thermonuclear pressure differences to generate sufficient lift to stay aloft at a high altitude range with adequate persistence. The solar powered radiometric lift device comprises a light transmissive membrane comprising a colder surface, and a light absorbing membrane comprising a hot surface powered by solar energy. A pressure differential is generated between the light transmissive membrane and the light absorbing membrane via free molecular momentum exchange. The solar powered radiometric lift device further comprises an insulating space between the light transmissive membrane and the light absorbing membrane allowing thermal transpiration.

A second embodiment comprises a method for generating solar powered radiometric lift. The method utilizes thermal transpiration and thermonuclear pressure differences to generate sustained lift at a high altitude range. The method comprises receiving solar light rays through a translucent membrane, and absorbing the solar light rays on a light absorbing membrane and heating the light absorbing membrane to obtain a hot surface. The method further comprises heating a near vacuum atmosphere in a container comprising the hot surface allowing a radiometric effect, providing at least one channel allowing thermal transpiration, and generating a lifting force via thermal transpiration and the radiometric effects.

A third embodiment comprises a solar powered radiometric lift platform. The solar powered radiometric lift platform provides a relatively stationary platform capable of operating effectively at high altitude. The solar powered radiometric lift platform utilizes a solar powered radiometric lift device to persistently support a payload at a high altitude range. The solar powered radiometric lift platform comprises a payload, a support structure, and a solar powered radiometric lift device. The solar powered radiometric lift device comprises a light transmissive membrane comprising a colder surface, and a light absorbing membrane comprising a hot surface powered by solar energy. A pressure differential is generated between the light absorbing membrane via free molecular momentum exchange, and an insulating space between the light absorbing membrane and the light transmissive membrane provides thermal transpiration.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure.

DETAILED DESCRIPTION

The following detailed description is merely illustrative in nature and is not intended to limit the embodiments of the disclosure nor the application and uses of such embodiments. Furthermore, there is no intention to be bound by any expressed or implied theory presented in the preceding technical field, background, brief summary or the following detailed description.

Embodiments of the disclosure are described herein in the context of a practical non-limiting application, namely, a high-altitude geostationary platform. Embodiments of the disclosure, however, are not limited to such high-altitude platform applications, and the techniques described herein may also be utilized in other applications using lift or propulsion. For example, embodiments may be applicable to propulsion for an airship. As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Embodiments of the present disclosure may be described herein in terms of various material construction steps. For the sake of brevity, conventional techniques and components related to lifting device fabrication, radiometric lift device, solar powered devices, solar energy, molecular momentum exchange, and other aspects of the process may not be described in detail herein. Embodiments of the disclosure may be described herein in terms of functional and/or logical block components and various processing steps. It should be appreciated that such block components may be realized by any number of hardware, software, and/or firmware components configured to perform the specified functions. In addition, those skilled in the art will appreciate that embodiments of the present disclosure may be practiced in conjunction with a variety of different configurations, and that the systems and/or devices described herein are merely example embodiments of the disclosure.

Disclosed is a lift generating device utilizing a unique material construction that absorbs solar energy, and thereby creates a thermal gradient from a hot surface to a cool surface. Radiometric principles are utilized to generate lift. The thermal gradient causes a difference in pressure from hot molecules impinging on the hot surface and cool molecules impinging on the cool surface. This difference in pressure is used to create a thermokinetic lift force. The two separated surfaces operate in a low pressure (near vacuum) atmosphere of low altitude space of about 100 km. Embodiments incorporating thermal transpiration and/or thermonuclear pressure differences are able to stay aloft in the 100 km altitude range with enough lift to support a payload without the need for the high velocities of an orbiting satellite.

Figure 1:
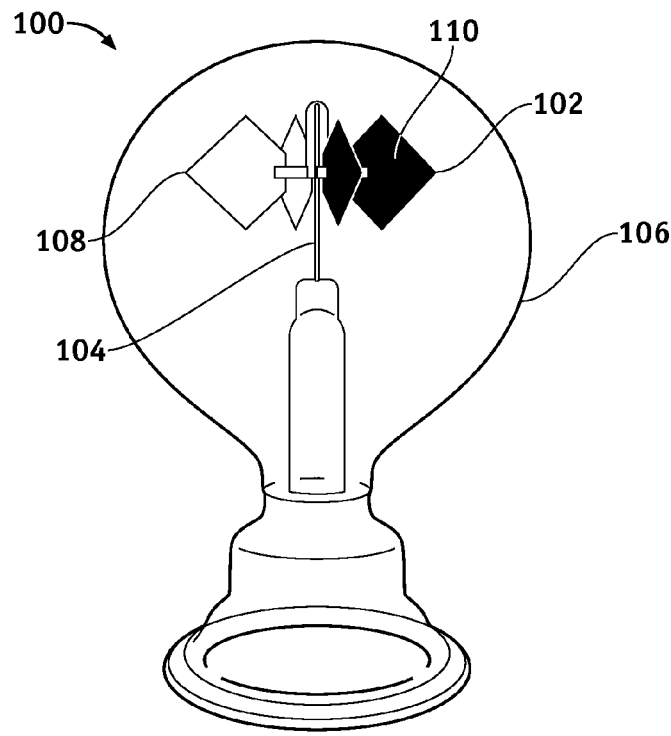
FIG. 1 illustrates an existing Crookes radiometer.

FIG. 1 illustrates a view of an existing Crookes radiometer 100 that utilizes radiometric generated force. The Crookes radiometer 100 has four vanes 102 on a rotating axis 104 in a near vacuum environment usually inside a glass bulb 106. One side of the vanes 102 is light colored 108 or mirrored (radiation reflecting), and the other is black 110 (radiation absorbing). When illuminated by radiation, the vanes rotate in the direction with the reflective side leading. The phenomena governing the motion of the Crooke's radiometer have been debated for more than a century. It is generally accepted that the majority of the impulse is generated near the edge of each of the vanes 102 by means of a combination of thermokinetic forces (postulated by Einstein) and thermal transpiration forces (postulated by Reynolds). The thermokinetic force is manifested by means of hot molecules recoiling from a "hot" surface with greater kinetic energy. Excluding the proximity of the edge (distances greater than a mean free path), this force is greatly reduced in the absence of extreme rarefaction (high Knudsen number (Kn)). The high temperature (high velocity) recoiling molecules impede the transmission of other ambient molecules to the surface resulting in a lower gas density, thus decreasing the number of molecules that strike the surface per unit time. Einstein showed that near the edge, however, the reduction in density is not as drastic and a net normal force (i.e., pressure increase) persists.

The second phenomena contributing to the motion of the radiometer is thermal transpiration which acts to deflect flow from the cool to hot side along the edge of the vane such that the momentum flux acts to turn the vanes 102. Early in 1879 Reynolds submitted a paper to the Royal Society in which he considered what he called "thermal transpiration", and also discussed the theory of the radiometer. By "thermal transpiration" Reynolds meant the flow of gas through porous plates caused by a temperature difference on the two sides of the plates. If the gas is initially at the same pressure on the two sides, there is a flow of gas from the colder to the hotter side, resulting in a higher pressure on the hotter side if the plates cannot move. Equilibrium is reached when the ratio of pressures on either side is the square root of the ratio of absolute temperatures.

The principle of thermal transpiration can be described in terms of an example of two volumes of gas at different temperatures $T_1$ and $T_2$ connected by a tube with a radius smaller than the mean free path ($\lambda$) of gas molecules. The behavior of this system depends on the Knudsen number (Kn=$\lambda$/L, where L is a characteristic linear dimension (diameter) of the tube). For Kn less than about 0.01 $\lambda$/L, the gas flows as a continuum. For Kn between about 0.01 and 10, the flow behavior of the gas is transitional between the continuum and free-molecular regimes. For Kn of about 10 or more, the flow regime is free-molecular. In the free-molecular regime, simple balancing of the equilibrium molecular fluxes between the volumes leads to the following equation for the equilibrium pressures in the two volumes: $p_1/p_2=(T_1/T_2)^{1/2}$. This is known as the thermonuclear pressure differential and can be exploited for pumping gas through a tube or channel. Thus, it is possible to start a rarefied gas flow with a tangential temperature gradient along channel walls, where the fluid starts creeping (flowing) in the direction from cold towards hot (i.e., thermal transpiration). One aspect of thermal transpiration is that it can cause zero net mass flow rate in the channel where thermal transpiration and pressure gradient balance each other.

Figure 2:
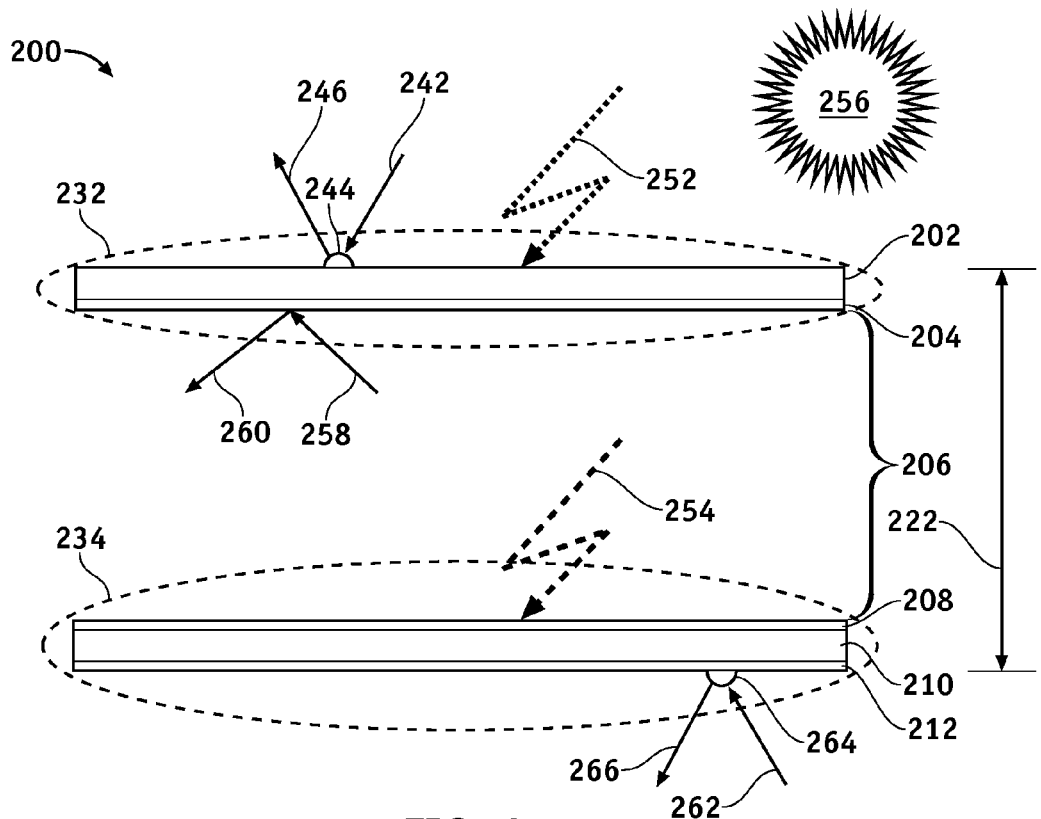
FIG. 2 illustrates a cross sectional view of an exemplary thermal trap according to an embodiment of the disclosure.

FIG. 2 illustrates a cross sectional view of an exemplary solar powered radiometric lift device 200 (thermal trap 200) according to an embodiment of the disclosure. The thermal trap 200 may comprise: a light transmissive membrane 232, a light absorbing membrane 234, and an insulating space 206. The solar powered radiometric lift device 200 may be, for example but without limitation, about 500 μm to about 12750 μm thick 222 and about 20 m to about 150 m in diameter (e.g., for a circular shape).

The light transmissive membrane 232 may comprise a membrane with two layers comprising a light transmissive layer 202 and an IR (Infrared) reflective layer 204. The light transmissive membrane 232 allows a light 252 (e.g., from sun 256) received on one side to pass through the light transmissive layer 202, while reflecting, via the IR reflective layer 204, infrared light 260 received 258 on the opposite side. Since the light transmissive membrane 232 absorbs a minimal amount of the light 252, its temperature remains close to ambient temperature. An incoming molecule 242 from ambient air is absorbed 244 on the light transmissive layer 202, and reemitted 246 at the same energy at which it was absorbed 244. The light transmissive membrane 232 may be coupled to the insulating space 206 by, for example but without limitation, an adhesive bond for an insulating space 206 comprising aerogel (aerogel insulating space), or being in contact with air/gas for an insulating space 206 comprising an air gap (air gap insulating space 206). The light transmissive membrane 232 may be, for example but without limitation, about 1.034 μm to about 7.6 μm thick and about 20 m to about 150 m in diameter.

The light transmissive layer 202 is light transmissive to useful light, and may comprise a single layer, or may have coatings or additional layers, and the like. The light transmissive layer 202 may comprise a variety of materials, for example but without limitation, mylar, graphene, and the like. The light transmissive layer 202 may be, for example but without limitation, 7.5 μm thick for mylar or 0.034 μm thick for graphene and about 20 m to about 150 m in diameter.

The IR reflective layer 204 is light transmissive to light with a frequency above the infrared frequency band and reflective to light with a frequency within the infrared frequency band. The IR reflective layer 204 may comprise a variety of materials, for example but without limitation, indium tin oxide and the like. The IR reflective layer 204 can be coated by a visibly light transmissive IR reflective coating such as indium tin oxide, and the like, which provides a high infrared reflective coating. The IR reflective layer 204 may be coupled to the light transmissive layer 202 by, for example but without limitation, an adhesive bond. The IR reflective layer 204 may be, for example but without limitation, about 0.1 μm thick and may be about 20 m to about 150 m in diameter.

The light absorbing membrane 234 may comprise a membrane with three layers comprising a solar absorption layer 208, a gas impermeable layer 210, and a low emittance layer 212. The light absorbing membrane 234 is heated by the transmitted light 254 transferred through the light transmissive membrane 232. When transmitted light 254 is absorbed by the solar absorption layer 208, incoming molecules 262 from ambient air are absorbed 264 on the low emittance layer 212, heated and reemitted 266 with higher velocity (i.e., temperature at the molecular level). The light absorbing membrane 234 may be coupled to the insulating space 206 by, for example but without limitation, an adhesive bond for an aerogel insulating space (306 in FIG. 3) or being in contact with air/gas for the air gap insulating space 206. The light absorbing membrane 234 may be, for example but without limitation, about 12.92 μm thick and about 20 m to about 150 m in diameter.

The solar absorption layer 208 may be coated with a high solar absorbance low infrared emittance material such as aluminum nitride over aluminum, TiAlN/TiAlON/$Si_3N_4$, and the like. The solar absorbance of this coating is about 0.92, and the infrared emittance is about 0.06. A tandem absorber of TiAlN/TiAlON/$Si_3N_4$ is a high solar energy absorber. The graded composition of the individual component layers of the tandem absorber produces a film with a refractive index increasing from the surface to the substrate, which exhibits a high absorbance (about 0.95) and a low emittance (about 0.07). The tandem absorber is stable in air up to about 600° C. for about 2 h, indicating its usefulness for high temperature solar applications. The thermal stability of the tandem absorber is attributed to high oxidation resistance and microstructural stability of the component materials at higher temperatures. The solar absorption layer 208 may be coupled to the insulating space 206 by, for example but without limitation, a bonding adhesive. The solar absorption layer 208 may be, for example but without limitation, about 0.122 μm thick and about 20 m to about 150 m in diameter.

The gas impermeable layer 210 provides structural support for the solar absorption layer 208 and the low emittance layer 212, and blocks gas from traversing the light absorbing membrane 234. The gas impermeable layer 210 may comprise a variety of materials, for example but without limitation, an aluminum foil layer, and the like. The gas impermeable layer 210 may comprise a single layer, or may have coatings or additional layers, and the like. The gas impermeable layer 210 may be coupled to the solar absorption layer 208 by, for example but without limitation, a bonding adhesive. The gas impermeable layer 210 may be, for example but without limitation, 12.7 μm thick and about 20 m to about 150 m in diameter.

The low emittance layer 212 emits a minimum of infrared light. This reduces heat loss by minimizing radiation loss from the solar absorption layer 208 so that the heat of the light absorbing membrane 234 is maintained. The low emittance layer 212 may comprise a gold layer or a gold coating, aerogel, and the like. The low emittance layer 212 may be coupled to the gas impermeable layer 210 by, for example but without limitation, a bonding adhesive. The low emittance layer 212 may be, for example but without limitation, about 0.1 µm thick and about 20 m to about 150 m in diameter.

The insulating space 206 is a light transmissive insulator to help maintain the temperature differential between the light transmissive membrane 232 and the light absorbing membrane 234. The insulating space 206 may comprise a light transmissive insulator such as, for example but without limitation, an air gap, an aerogel, and the like. The insulating space 206 may be coupled to the light transmissive membrane 232 and the light absorbing membrane 234 by, for example but without limitation, an adhesive bond for an aerogel or nothing for an air gap. The insulating space 206 may be, for example but without limitation, about 12700 µm (12.7 mm) thick 222 and about 20 m to about 150 m in diameter.

In the embodiment shown in FIG. 2 the solar powered radiometric lift device 200 and corresponding layers are circular in shape. However, other shapes such as, without limitation, triangular, rectangular, and the like, may also be used. Furthermore, different layers and membranes of the solar powered radiometric lift device 200 may have the same or different shapes.

Aerogel is one of the most effective low weight insulators. Aerogel is a manufactured material with one of the lowest densities of any known solid. It is derived from a gel in which a liquid component of the gel has been replaced with a gas. The result is an extremely low-density solid with several properties, such as effectiveness as a thermal insulator and extremely low density. Aerogel is also called frozen smoke due to its translucent nature and the way it scatters light. Aerogel is structurally a solid like polystyrene foam, and there are several types of aerogels such as Silica aerogels, Carbon aerogels, Alumina aerogels, and the like.

The thermal trap 200 creates a "thermal trap" where the light transmissive membrane 232 operates at a lower temperature than the light absorbing membrane 234. In operation, sunlight 252 passes through the light transmissive membrane 232 and is absorbed by the light absorbing membrane 234, which can heat up to create a large temperature difference between the light transmissive membrane 232 and light absorbing membrane 234. This large temperature difference can create a flow of gas from the light transmissive membrane 232 (colder) to the light absorbing membrane 234 (hotter side), resulting in a higher pressure on the hotter side. This pressure difference can generate enough lift to support a payload based on the radiometric principles as described above.

Figure 3:
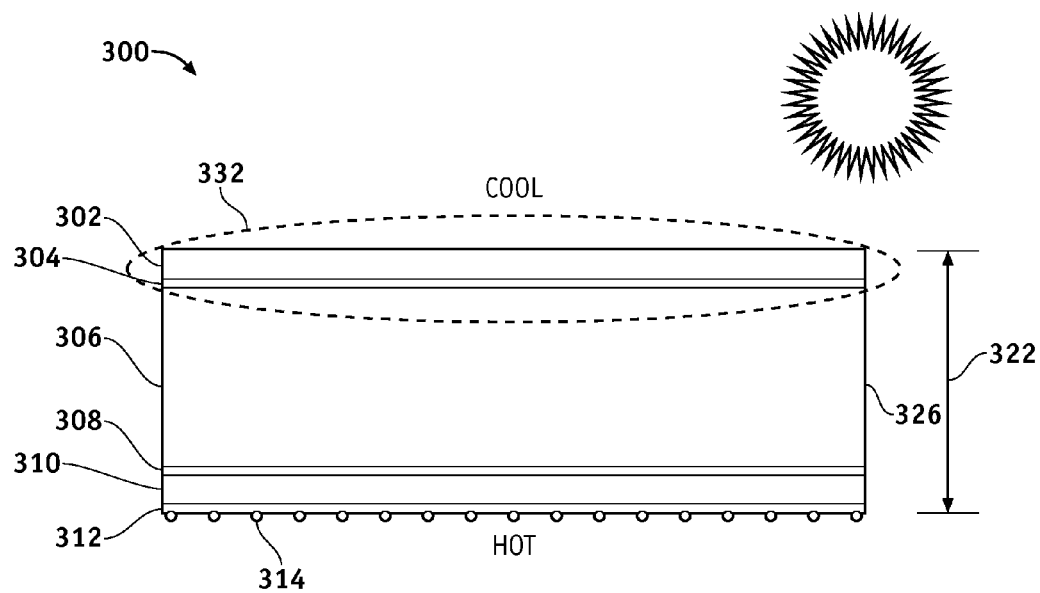
FIG. 3 illustrates a cross-section view of an exemplary radiometric lift device according to an embodiment of the disclosure.

FIG. 3 illustrates a cross sectional view of an exemplary radiometric lift device 300 according to an embodiment of the disclosure. The radiometric lift device 300 comprises a light transmissive layer 302, an IR reflective layer 304, an insulating space 306, an solar absorption layer 308, a gas impermeable layer 310, and a low emittance layer 312. Like elements are previously described above and will not be redundantly described herein.

The radiometric lift device 300 also comprises a support structure 314. The radiometric lift device 300 may extend to a considerable length in an operational device, for example without limitation, about 100 m. Aerodynamic stress, operational stress and the like may cause sheering forces on the radiometric lift device 300. The support structure 314 can provide additional support to the other materials used to form the radiometric lift device 300. The support structure 314 may comprise a variety of light weight structures, such as without limitation, a mesh of fiberglass, metal, Kevlar, graphite fiber, and the like. The support structure 314 may be coupled to the low emittance layer 312 by, for example but without limitation, fasteners, an adhesive bond, and the like. The support structure 314 may be, for example but without limitation, an about 1 cm by about 1 cm mesh comprising 1 mm webbing.

The radiometric lift device 300 generates lift based on free molecular momentum exchange. In a low pressure environment, molecules can be in a free molecular flow environment where molecules basically do not collide with each other in the vicinity of the radiometric lift device 300. Free molecular flow describes the fluid dynamics of gas where the mean free path of the molecules is larger than the size of the chamber (the size of the glass bulb 106 for the Crookes radiometer in FIG. 1) or of an object under test. For tubes/objects of a size of several cm, this means pressures well below $10^{-3}$ torr. This is also called the "regime of high vacuum". A regime of high vacuum is present in the high atmosphere of the earth where the radiometric lift device 300 can operate.

During operation of the radiometric lift device 300, solar irradiation passes through light transmissive membrane 332 comprising the light transmissive layer 302 (e.g., light transmissive Mylar or Graphene) and the IR reflective layer 304. The (high alpha) solar absorption layer 308 is heated. For the radiometric lift device 300, the insulating space 306 comprises aerogel. The insulating space 306 maintains a thermal gradient between a cool surface (IR reflective layer 304) and a hot surface (solar absorption layer 308). A lift force results from molecules leaving the hot surface (solar absorption layer 308) with high momentum and the cool surface (IR reflective layer 304) with low momentum. There is a limited amount of radiometric contribution at device edges 326 of the radiometric lift device 300. The hot surface (solar absorption layer 308) powered by solar energy and the cool surface (IR reflective layer 304) are utilized to generate a pressure differential via free molecular momentum exchange. As shown below in the context of FIG. 4, channels may be formed between the hot surface (solar absorption layer 308) and the cool surface (IR reflective layer 304) allowing thermal transpiration.

Figure 4:
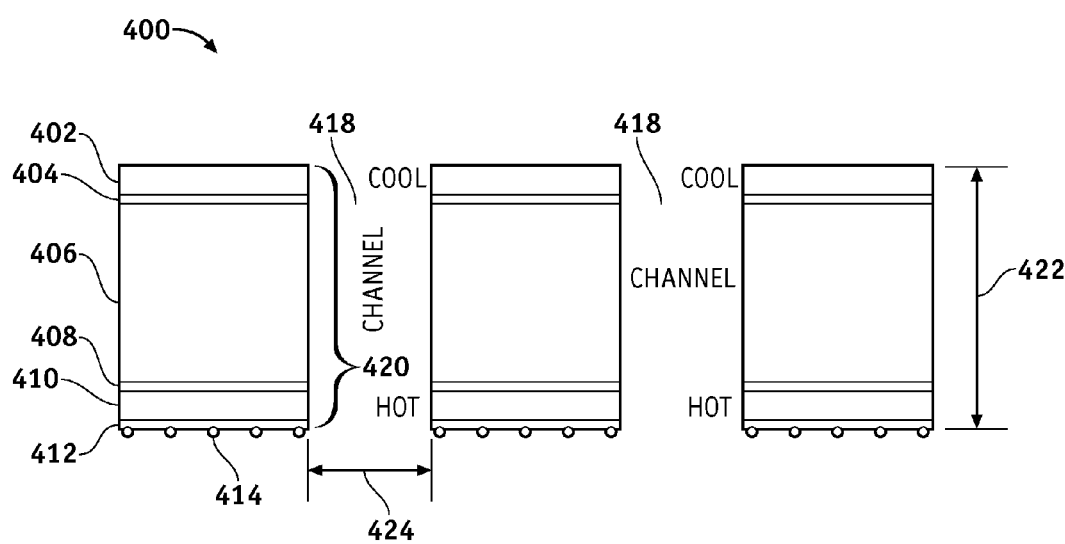
FIG. 4 illustrates a cross sectional view of an exemplary radiometric lift device according to an embodiment of the disclosure.

FIG. 4 illustrates a cross sectional view of an exemplary radiometric lift device 400 according to an embodiment of the disclosure. The radiometric lift device 400 comprises a light transmissive layer 402, an IR reflective layer 404, an insulating space 406, a solar absorption layer 408, a gas impermeable layer 410, and a low emittance layer 412, a support structure 414, and channel edges 420. These elements are previously described above and will not be redundantly described herein.

The radiometric lift device 400 also comprises a plurality of channels 418. The channels 418 extend through the light transmissive layer 402, through intermediate layers 402, 404, 406, 408 and 410, and through the low emittance layer 412. The channels 418 may comprise various shapes such as, without limitation, holes or slots. The channels 418 may comprise a substantial percentage of an area of the radiometric lift device 400. For example but without limitation, the channels 418 may comprise about 50% to 60% of the area of the radiometric lift device 400.

The channels 418 allow thermal transpiration. While radiometric lift device 300 operates with primarily thermokinetic free molecular momentum exchange with a limited amount of thermal transpiration around the device edges 322, the radiometric lift device 400 in effect greatly increases the edge area of the radiometric lift device 400 by including area of the channel edges 420. Length 422 of each of the channels 418 and the width 424 of each of the channels 418 can be chosen to optimize the thermal transpiration through each of the channels 418. The length 422 may vary according to an operational altitude, and/or may be chosen according to a designed operational altitude. For example but without limitation, the length 422 may be 500 μm and the like, and the width 424 may be 200 μm or equal to a local mean free path of molecules, and the like. Alternatively, the width 424 may vary nominally in the vicinity of the local mean free path for purposes of weight, flow structure, and performance optimization.

The radiometric lift device 400 operates by generating lift directly by radiometric force (Direct Radiometric Lift). This embodiment increases edge area by providing channels 418 with channel edges 420. The channels 418 may be in the shape of holes or slots as explained below in the context of FIG. 5. Solar irradiation passes through the radiometric lift device 400, and the (high alpha) solar absorption layer 408 is heated. The insulating space 406 maintains a thermal gradient between a cool surface (IR reflective layer 404) and hot surface (solar absorption layer 408). The thermal gradient causes thermal transpiration through the channels 418 creating a pressure gradient and resulting lift.

Figure 5:
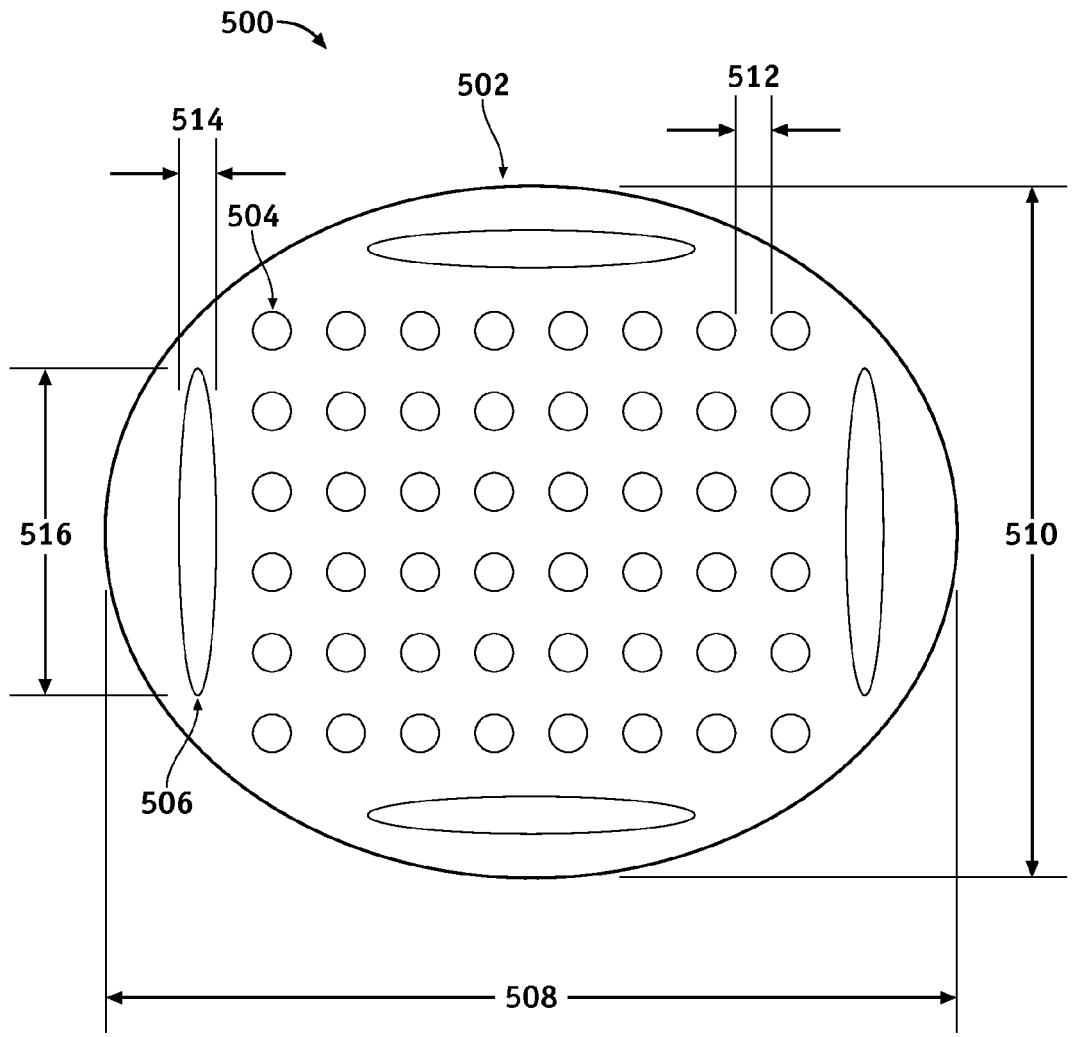
FIG. 5 illustrates a channel outlet planform view of an exemplary radiometric lift device according to an embodiment of the disclosure.

FIG. 5 illustrates a channel outlet planform view of an exemplary radiometric lift device 500 according to an embodiment of the disclosure. The radiometric lift device 500 may be of various shapes such as, for example but without limitation, a disk or an ellipsoid. In one embodiment, the radiometric lift device 500 may be, for example but without limitation, a disk about 20 m in diameter or an ellipsoid 20 m by 30 m in minor and major diameters respectively. The radiometric lift device 500 comprises an ellipsoid 502, a plurality of holes 504, and a plurality of slots 506. In another embodiment, the ellipsoid 502 may have, without limitation, a length 508 of about 3 cm and a width 510 of about 2 cm. The holes 504 comprise outlets for channels such as channels 418 in radiometric lift device 400. The holes 504 may have, without limitation, a diameter of about 200 μm, and may be spaced at a spacing distance 512 of about 250 μm. The slots 506 may have, without limitation, a slot width 514 of about 200 μm and a slot length 516 of 2000 μm. FIG. 5 is illustrative and not to proportion, number, or scale. In practice, holes 504 and slots 506 may be, without limitation, much more numerous and much smaller in proportion to the device 500.

Figure 6:
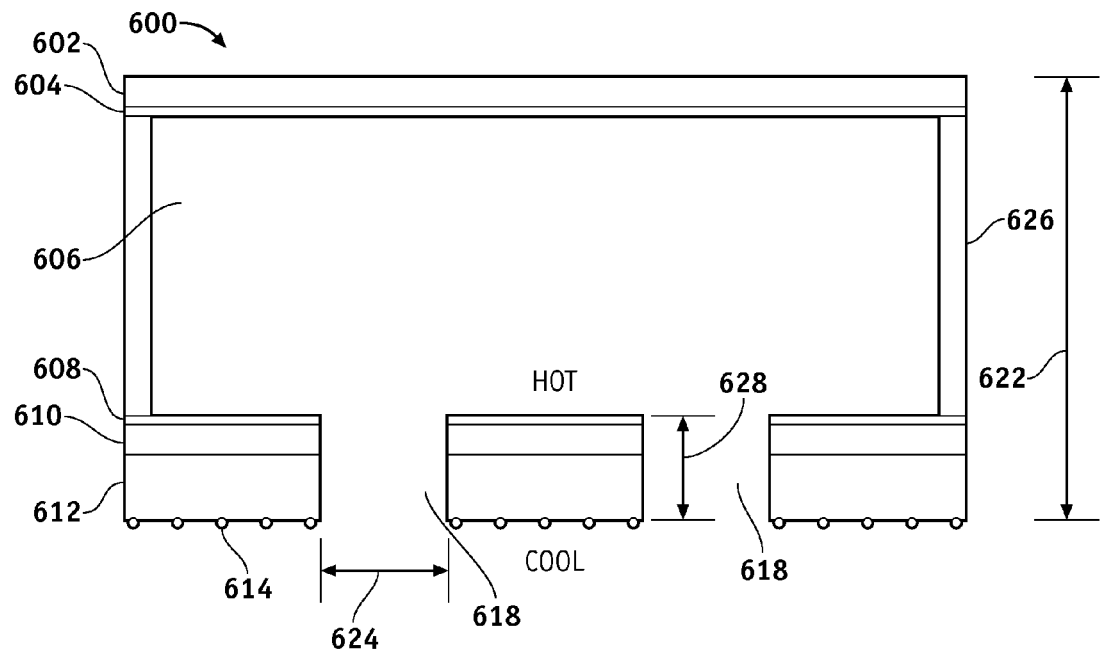
FIG. 6 illustrates a cross sectional view of an exemplary radiometric lift device according to an embodiment of the disclosure.

FIG. 6 illustrates a cross sectional view of an exemplary radiometric lift device 600 according to an embodiment of the disclosure. The radiometric lift device 600 comprises a light transmissive layer 602, an IR reflective layer 604, a pressure cavity 606 (insulating space 606), a solar absorption layer 608, gas impermeable layer 610, a low emittance layer 612, a support structure 614, and plurality of channels 618. The radiometric lift device 600 has a structure that is similar to the radiometric lift devices 200-500, common features, functions, and elements will not be redundantly described herein.

The pressure cavity 606 may be bounded by the IR reflective layer 604, at least a portion of the solar absorption layer 608, and at least one sidewall 626.

The channels 618 are configured to allow thermal transpiration. The channels 618 extend through at least one portion of the solar absorption layer 608, the gas impermeable layer 610, and the low emittance layer 612. The channels 618 may comprise various shapes such as, without limitation, holes or slots as explained above in the context of discussion of FIG. 5. The channels 618 may comprise a substantial percentage of an area of the solar absorption layer 608. For example, the channels 618 may comprise, without limitation, about 50% to about 60% of the area of the solar absorption layer 608. Thus, the solar absorption layer 608 may comprise an area, without limitation, about 50% to about 60% smaller than the area of the IR reflective layer 604.

The low emittance layer 612 comprises an aerogel. When the aerogel is used for the low emittance layer 612, the aerogel may provide most of a length 628 of the channels 618. The length 628 and the width 624 (diameter) as well as spacing distance 512 (FIG. 5) of each of the channels 618 can be chosen to optimize the effects of thermal transpiration through the channels 618.

In one embodiment, the length 628 can also be increased by optimizing surface diffusivity/reflectivity. For example, incorporating selectively "smooth" channel walls (with respect to molecular diameter) to promote specular molecular reflections minimizing the shear stress. This would be in contrast to "rough" walls which promote diffuse reflections and maximize the shear stress. In practice, the embodiments of the disclosure may be optimized in terms of dimensions, thermal gradient, weight, surface accommodation, and lift force.

The low emittance layer 612 may be coupled to the gas impermeable layer 610 by, for example but without limitation, a bonding adhesive. The low emittance layer 612 may be, for example but without limitation, 500 μm thick and the length and width may be the same as the gas impermeable layer 610.

In practice, the radiometric lift device 600 operates by generating a thermo-molecular pressure difference to pressurize the pressure cavity 606 (Low Pressure Lift Cavity). The pressure cavity 606 has more surface area on the IR reflective layer 604 than on the solar absorption layer 608 because of the area reduction caused by channels 618. As a result, there is a larger pressure force on the IR reflective layer 604 than on the IR reflective layer 604 resulting in a net lift force.

Solar irradiation passes through light transmissive layer 602. In this manner, the (high alpha) solar absorption layer 608, which forms a surface of the pressure cavity 606, is heated. The aerogel standoff/low emittance layer 612 maintains a thermal gradient between the cool low emittance layer 612 and hot solar absorption layer 608. Therefore, a thermo-molecular pressure difference is generated via thermal transpiration. In this manner, as explained above, the pressure cavity 606 exerts a greater force on the IR reflective layer 604 than on the solar absorption layer 608 resulting in the net lift force.

Figure 7:
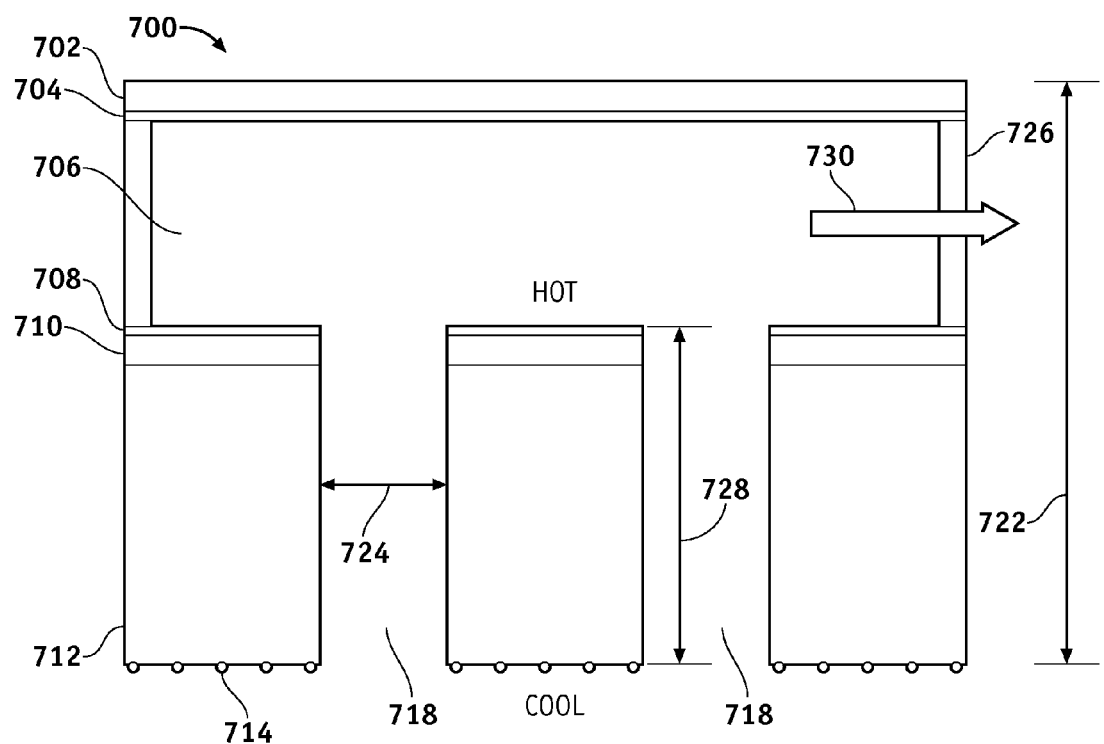
FIG. 7 illustrates a cross sectional view of an exemplary radiometric lift device according to an embodiment of the disclosure.

FIG. 7 illustrates a cross sectional view of an exemplary radiometric lift device 700 according to an embodiment of the disclosure. The radiometric lift device 700 comprises a light transmissive membrane 702, an IR reflective layer 704, an insulating space 706, a solar absorption layer 708, a gas impermeable layer 710, and a low emittance layer 712, a support structure 714, and a plurality of channels 718. The radiometric lift device 700 has a structure that is similar to the radiometric lift devices 200-600, common features, functions, and elements will not be redundantly described herein.

The insulating space 706 comprises a pressure cavity 706 bounded by the IR reflective layer 704, at least a portion of the solar absorption layer 708, and at least one side wall 726, as described above.

The low emittance layer 712 comprises an aerogel. When the aerogel is used for the low emittance layer 712, the aerogel may provide most of a length 728 to the channels 718. The length 728 and the width 724 as well as diameter and spacing distance 512 (FIG. 5) of each of the channels 718 can be chosen to optimize the thermal transpiration through the channels 718. The length 728 of each of the channels 718 can be increased by optimizing surface diffusivity/reflectivity as explained above.

In practice, the radiometric lift device 700 operates by generating a high pressure lift cavity. The radiometric lift device 700 uses long channels 718 (or capillaries) to increase the overall temperature gradient and resulting pressure in the pressure cavity 706. Depending on channel size and flow characteristics, the increased pressure may be countered by shear forces in the channel so that there is not necessarily a direct increase in lift, but the high pressure may be used to generate lift or do work in some other way. For example, the high pressure may be used for a directional jet 730 to produce, three-axis control (pitch, yaw, roll), maneuvering thrust, position control, rotation, and the like. However, lift can also be generated directly by varying the molecular diffusivity/reflectivity properties of the surface accordingly as explained above in the context of FIG. 6.

In practice, solar irradiation passes through the light transmissive membrane 702 (e.g., light transmissive Mylar or Graphene). In this manner, the solar absorption layer 708 of pressure cavity 706 is heated. The low emittance layer 712 (e.g., Aerogel) maintains a thermal gradient between a cool surface (the support structure 714 side of the low emittance layer 712) and a hot absorbing surface (solar absorption layer 708). Thermomolecular pressure difference is generated via thermal transpiration through long channels 718 (i.e., high pressure is counteracted by shear force in long channels 718). In one embodiment, the insulating space 706 comprises a plurality of individual high pressure cavities that can be periodically (not necessarily simultaneously) released to do external work (i.e., through jets, nozzles, and the like). Hole/slot diameter and spacing distance 512 (FIG. 5) of the channels 718, may be, for example but without limitation, about 200 μm and about 250 μm respectively.

Radiometric force is closely correlated with a chamber size containing a radiometric device (i.e., the size of the glass bulb 106 for the Crookes radiometer in FIG. 1). Thus, in placing the radiometric lift device 200/300/400/500/600/700 in an infinite domain (i.e., the atmosphere) the radiometric force may be significantly diminished. This can affect radiometric lift devices 300 and 400, but not radiometric lift devices 600 and 700 since radiometric lift device 600 and 700 work based on a thermomolecular pressure difference resulting from the radiometric force and not the radiometric force directly. Basically, the larger the domain, the more the ambient pressure "imparts" itself on the various surfaces, which keeps the product of temperature and density nearly constant (i.e., temperature increase means density drops such that the pressure is roughly the same). The closer to collisionless flow an ambient gas becomes, the better the radiometric lift device 300 and 400 can work. This is not to say the force will continue to increase indefinitely, since the decreasing ambient density provides for fewer molecules available for momentum exchange.

Figure 8:
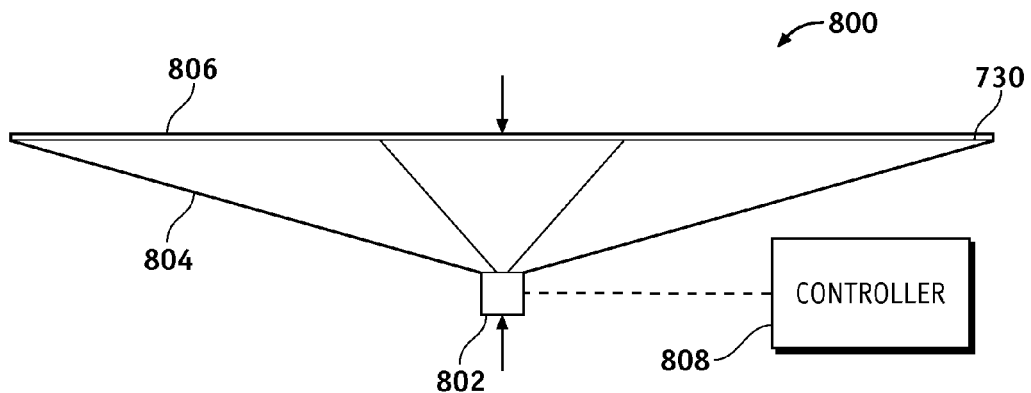
FIG. 8 illustrates a perspective side view of an exemplary stratospheric platform utilizing a radiometric lift device according to an embodiment of the disclosure.

FIG. 8 illustrates a perspective side view of an exemplary stratospheric platform 800 utilizing a radiometric lift device according to an embodiment of the disclosure. FIG. 8 shows one method for accommodating a payload by suspending it from one of the radiometric lift devices 200-700. The stratospheric platform 800 may comprise: a payload 802, a support structure 804, a solar powered radiometric lift device 806, and a controller 808. The stratospheric platform 800 may operate, without limitation, from about 60 km to about 100 km.

The payload 802 may comprise, for example but without limitation, a radio relay, a cellular base station, a television, radio, or other broadcast antenna, surveillance device, a weapons platform (i.e., a UAV), and numerous other application payloads. The payload 802 may be of various kinds such as, without limitation, sensors, antennas, imaging devices, and the like, and located at various locations on the stratospheric platform 800. The weight of the payload 802 may be, without limitation, about 2000 kg for a stratospheric platform about 100 m in diameter.

The support structure 804 may be, without limitation, a web of fiberglass, Kevlar, graphite and the like, and may be coupled to the payload 802 and to the solar powered radiometric lift device 806. The support structure 804 can be many types of structures such as, without limitation, wires, lattices, trusses, and the like. The support structure 804 is preferably light weight.

The solar powered radiometric lift device 806 is described above in the context of discussion of FIGS. 2-7. Any of the embodiments of the solar powered radiometric lift device (e.g., 200-700) may be used in various numbers and combinations. The solar powered radiometric lift device 806 may comprise one or more of the directional jets 730 shown in the solar powered radiometric lift device 700. The directional jets 730 provide thrust for actions such as, without limitation, maneuvering thrust, pitch control, yaw control, roll control, rotation, and the like. The solar powered radiometric lift device 806 may be coupled to the support structure 804 by, for example but without limitation, fasteners, adhesives, and/or couplers, and the like. The solar powered radiometric lift device 806 may be, for example but without limitation, about 500 μm thick and 100 m in diameter.

The controller 808, may be located in the payload 802, or remotely from the stratospheric platform 800, or may be coupled to the stratospheric platform 800. The controller 808 is operable for directing station keeping thrust, and/or generally controlling the stratospheric platform 800. The controller 808 may be implemented as part of the stratospheric platform 800, a centralized processor, a subsystem computing module devoted to direct station keeping, or the like.

The controller 808 may include any number of distinct processing modules, correlators, or components that are configured to perform the tasks, processes, and operations described in more detail herein. A practical implementation may utilize any number of distinct physical and/or logical processors, which may be dispersed throughout stratospheric platform 800. In practice, the controller 808 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

In operation, the controller 808 may perform station keeping by monitoring the coordinates (altitude, longitude, latitude) of the stratospheric platform 800 and by generating thrust in an appropriate direction as needed for station keeping. This enables the controller 808 to control the position of the stratospheric platform 800 to maintain a position in spite of winds and other forces. For example, a goal may be to maintain the stratospheric platform 800 in a geostationary position.

As explained above, existing solutions do not provide lift devices operable at high altitudes for a persistent presence at high altitude. The solar powered radiometric lift devices according to various embodiments of the disclosure utilize solar energy to remove the requirement for terrestrial energy sources enabling persistent ISR in inaccessible areas. Embodiments of the solar powered radiometric lift device are operable to provide sufficient lift for a geostationary stratospheric platform. The embodiments are further operable to provide station keeping thrust. In this manner, a payload platform can remain aloft at, for example, the 100 km altitude range without orbiting for persistent ISR (imaging, surveillance, and reconnaissance) in denied areas. The solar powered radiometric lift device does not require any external power source other than the sun, and can operate at extreme altitudes. The solar powered radiometric lift device can have the capability to survey an about 600-mile (970 km) diameter of land for surveillance, weather observations and the like.

Figure 9:
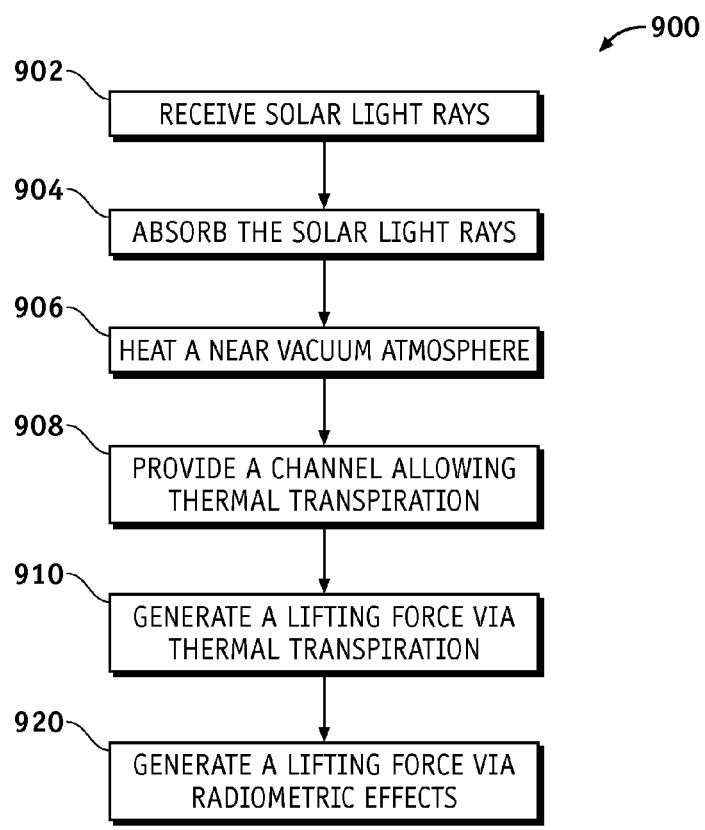
FIG. 9 is a flowchart showing an exemplary process for generating solar powered radiometric lift according to an embodiment of the disclosure.

FIG. 9 is a flowchart showing an exemplary process 900 for generating solar powered radiometric lift according to an embodiment of the disclosure. The various tasks performed in connection with process 900 may be performed by software, hardware, firmware, or any combination thereof. For illustrative purposes, the following description of process 900 may refer to elements mentioned above in connection with FIGS. 2-8. In practical embodiments, portions of process 900 may be performed by different elements of devices 200-700 and the platform 800 for generating lift and/or propulsion. Process 900 is described in terms of an exemplary application namely, generating lift and/or propulsion, utilizing one embodiment. Process 900 uses a structure and functionalities that are similar to devices 200-700 and the platform 800; therefore, common features, functions, and elements will not be redundantly described here.

Process 900 may begin by receiving solar light rays through a light transmissive membrane (task 902). Process 900 may continue by absorbing the solar light rays on a light absorbing membrane heating the light absorbing membrane to obtain a hot membrane (task 904). Process 900 may continue by heating a near vacuum atmosphere in a container comprising the hot surface (task 906) to produce radiometric effects. Process 900 may continue by providing a channel allowing thermal transpiration (task 908). Process 900 may continue by generating a lifting force via thermal transpiration (task 910), and generating a lift force via the radiometric effects (task 920).

In this way, the solar powered radiometric lift device according to various embodiments of the disclosure provides sufficient lift for a geostationary stratospheric platform that could remain aloft at, for example, the 100 km altitude range, without orbiting, for persistent ISR in denied areas.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The previous description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-8 depict example arrangements of elements, additional intervening elements, devices, features, or components may be present in an embodiment of the disclosure.

The invention claimed is:

1. A solar powered radiometric lift device, comprising:
   a light transmissive membrane comprising a colder surface;
   a light absorbing membrane comprising a hot surface powered by solar energy, and operable to generate a pressure differential from the light transmissive membrane to the light absorbing membrane via free molecular momentum exchange; and
   an insulating space between the light transmissive membrane and the light absorbing membrane allowing thermal transpiration.

2. The solar powered radiometric lift device according to claim 1, wherein the light transmissive membrane comprises a light transmissive layer and an IR reflective layer.

3. The solar powered radiometric lift device according to claim 2, wherein the light transmissive layer comprises at least one of the group consisting of: mylar and graphene.

4. The solar powered radiometric lift device according to claim 2, wherein the IR reflective layer comprises indium tin oxide.

5. The solar powered radiometric lift device according to claim 1, wherein the light absorbing membrane comprises a solar absorption layer, a gas impermeable layer, and a low emittance layer.

6. The solar powered radiometric lift device according to claim 5, wherein the solar absorption layer comprises a tandem absorber comprising TiAlN/TiAlON/$Si_3N_4$.

7. The solar powered radiometric lift device according to claim 5, wherein the gas impermeable layer comprises an aluminum foil layer.

8. The solar powered radiometric lift device according to claim 5, wherein the low emittance layer comprises at least one of the group consisting of: a gold layer and an aerogel layer.

9. The solar powered radiometric lift device according to claim 5, wherein the light absorbing membrane further comprises a support structure coupled to the low emittance layer.

10. The solar powered radiometric lift device according to claim 1, wherein the light absorbing membrane further comprises at least one channel allowing thermal transpiration.

11. The solar powered radiometric lift device according to claim 10, wherein the at least one channel has a width based on a local mean free path.

12. The solar powered radiometric lift device according to claim 11, wherein the insulating space comprises a pressure cavity and at least one sidewall, and wherein the pressure cavity is bounded by the light transmissive membrane, at least one portion of the light absorbing membrane, and the at least one sidewall.

13. The solar powered radiometric lift device according to claim 12, wherein the at least one channel has a width chosen such that the pressure cavity comprises a high pressure cavity operable to contain a high pressure.

14. The solar powered radiometric lift device according to claim 13, further comprising means for directing the high pressure.

15. A method for generating solar powered radiometric lift, the method comprising:
receiving solar light rays through a light transmissive membrane;
absorbing the solar light rays on a light absorbing membrane to obtain a hot surface;
heating a near vacuum atmosphere in a container comprising the hot surface to produce a radiometric effect;
providing at least one channel to produce a thermal transpiration effect;
generating a first lifting force via the thermal transpiration effect; and
generating a second lifting force via the radiometric effect.

16. The method according to claim 15, further comprising generating a pressure in a cavity.

17. The method according to claim 15, further comprising producing a directional jet from the pressure in the cavity.

18. The method according to claim 15, further comprising maintaining a position using the directional jet.

19. A solar powered radiometric lift platform, comprising:
a payload;
a support structure coupled to the payload; and
a solar powered radiometric lift device coupled to the support structure comprising:
a light transmissive membrane comprising a colder surface;
a light absorbing membrane comprising a hot surface powered by solar energy, and operable to generate a pressure differential from the light transmissive membrane to the light absorbing membrane via free molecular momentum exchange; and
an insulating space between the light absorbing membrane and the light transmissive membrane allowing thermal transpiration.

20. The solar powered radiometric lift platform according to claim 19, further comprising a controller operable for directing station keeping.

* * * * *